US010727597B2

(12) United States Patent
Boffa et al.

(10) Patent No.: US 10,727,597 B2
(45) Date of Patent: Jul. 28, 2020

(54) DIELECTRIC ANTENNA DEVICE FOR WIRELESS COMMUNICATIONS

(75) Inventors: Vincenzo Boffa, Milan (IT); Simone Germani, Milan (IT); Stefano Passi, Mede (IT); Fabrizio Ricci, Milan (IT); Roberto Vallauri, Turin (IT)

(73) Assignee: ADVANCED DIGITAL BROADCAST S.A., Bellevue (CH)

( * ) Notice: Subject to any disclaimer, the term of this patent is extended or adjusted under 35 U.S.C. 154(b) by 792 days.

(21) Appl. No.: 12/311,429

(22) PCT Filed: Oct. 9, 2006

(86) PCT No.: PCT/EP2006/009647
§ 371 (c)(1),
(2), (4) Date: Aug. 6, 2009

(87) PCT Pub. No.: WO2008/043369
PCT Pub. Date: Apr. 17, 2008

(65) Prior Publication Data
US 2009/0305652 A1 Dec. 10, 2009

(51) Int. Cl.
*H04B 1/38* (2015.01)
*H01Q 9/04* (2006.01)
*H01Q 1/44* (2006.01)
*H01Q 1/42* (2006.01)
*H01Q 1/24* (2006.01)

(52) U.S. Cl.
CPC ........... *H01Q 9/0485* (2013.01); *H01Q 1/246* (2013.01); *H01Q 1/42* (2013.01); *H01Q 1/44* (2013.01)

(58) Field of Classification Search
USPC .................. 455/90.3; 343/700 R, 830.911 R
See application file for complete search history.

(56) References Cited

U.S. PATENT DOCUMENTS 4,903,326 A * 2/1990 Zakman et al. ........... 455/575.7
5,154,973 A 10/1992 Imagawa et al.
5,471,222 A * 11/1995 Du ............................... 343/713
(Continued)

FOREIGN PATENT DOCUMENTS

EP 0 884 799 A2 12/1998
EP 1 225 652 A1 7/2002
(Continued)

OTHER PUBLICATIONS

An, H. et al., "A Novel Microwave Omnidirectional Antenna for Wireless Communications," IEEE Microwave Systems Conference, No. 8A-1, pp. 221-224, (1995).
(Continued)

*Primary Examiner* — Yuwen Pan
*Assistant Examiner* — Erica L Fleming-Hall
(74) *Attorney, Agent, or Firm* — Mark M. Friedman

(57) ABSTRACT

A wireless transceiver station including an antenna device and a casing, the antenna device including at least one resonator element cooperating with the casing of the wireless transceiver station and having a shape with a low aspect ratio so as to be conformal with the casing, the at least one resonator element including a composite material and being adapted to be excited by a feed system which is positioned inside the resonator element so as to allow the antenna device to irradiate with a substantially omnidirectional radiation pattern.

23 Claims, 11 Drawing Sheets

(56) References Cited

U.S. PATENT DOCUMENTS

| | | | | |
|---|---|---|---|---|
| 5,483,246 | A * | 1/1996 | Barnett et al. | 343/700 MS |
| 5,864,318 | A * | 1/1999 | Cosenza et al. | 343/700 MS |
| 5,940,036 | A * | 8/1999 | Oliver | H01Q 9/0485 333/219.1 |
| 5,955,752 | A | 9/1999 | Fukaya et al. | |
| 6,087,990 | A * | 7/2000 | Thill | H01Q 1/3275 343/700 MS |
| 6,147,647 | A * | 11/2000 | Tassoudji et al. | 343/700 MS |
| 6,150,984 | A * | 11/2000 | Suguro et al. | 343/702 |
| 6,323,824 | B1 * | 11/2001 | Heinrichs et al. | 343/846 |
| 2001/0043158 | A1 * | 11/2001 | Adachi et al. | 343/700 MS |
| 2002/0093457 | A1 | 7/2002 | Hamada et al. | |
| 2002/0140607 | A1 * | 10/2002 | Zhou | 343/700 MS |
| 2002/0180647 | A1 * | 12/2002 | Nysen | 343/702 |
| 2002/0180656 | A1 * | 12/2002 | Pecora, Jr. | H01Q 1/40 343/795 |
| 2002/0196190 | A1 * | 12/2002 | Lim | 343/700 MS |
| 2003/0201937 | A1 * | 10/2003 | Lee | 343/700 MS |
| 2003/0232603 | A1 * | 12/2003 | Tanaka | H01P 1/2005 455/90.3 |
| 2004/0174316 | A1 * | 9/2004 | Keren | 343/867 |
| 2004/0183730 | A1 * | 9/2004 | Jecko et al. | 343/702 |
| 2005/0057402 | A1 * | 3/2005 | Ohno et al. | 343/700 MS |
| 2005/0162321 | A1 * | 7/2005 | Colburn et al. | 343/702 |
| 2005/0225499 | A1 * | 10/2005 | Kingsley et al. | 343/911 R |
| 2006/0001584 | A1 * | 1/2006 | Durso | H01Q 1/12 343/718 |
| 2006/0232474 | A1 * | 10/2006 | Fox | H01Q 5/357 343/700 MS |
| 2006/0284770 | A1 * | 12/2006 | Jo et al. | 343/700 MS |
| 2007/0164420 | A1 * | 7/2007 | Chen et al. | 257/691 |
| 2007/0252778 | A1 * | 11/2007 | Ide | H01Q 9/0485 343/700 MS |
| 2007/0262914 | A1 * | 11/2007 | Chau | H01Q 1/362 343/895 |

FOREIGN PATENT DOCUMENTS

| | | |
|---|---|---|
| GB | 2 414 862 | 12/2005 |
| WO | WO 2005/057722 A1 | 6/2005 |

OTHER PUBLICATIONS

Guha, D. et al., "Four-Element Cylindrical Dielectric Resonator Array: Broadband Low Profile Antenna for Mobile Communications," Proceedings URSI 2005, GA, 4 Sheets, (2005).

Moulart, A. et al., "Polymeric Composites for Use in Electronic and Microwave Devices," Polymer Engineering and Science, vol. 44, No. 3, pp. 588-597, (Mar. 2004).

* cited by examiner

DIELECTRIC ANTENNA DEVICE FOR WIRELESS COMMUNICATIONS

CROSS REFERENCE TO RELATED APPLICATION

This application is a national phase application based on PCT/EP2006/009647, filed Oct. 9, 2006.

BACKGROUND OF THE INVENTION

Field of the Invention

The present invention relates to wireless communications. In particular, the present invention relates to antenna devices preferably used with transceiver stations for local area radio coverage such as for example gateways, routers, access points, PCs etc.

BACKGROUND ART

Antenna devices for wireless communications can be divided into two different broad classes: "external antennas" (for example monopoles or dipoles) and "integrated antennas" (for example printed or inverted antennas or high dielectric antennas) according to their position with respect to an electronic equipment casing.

Monopoles or dipoles can represent a solution for external antennas for wireless communication purposes since they have an omnidirectional radiation pattern in the plane of the wireless transceiver.

Integrated antennas are typically printed or inverted antenna; these antennas provide a radiation pattern with a maximum value of the radiated field mainly in a direction orthogonal to the antenna plane.

Further, High Dielectric Antennas (HDAs) represent a suitable technology for antenna integration, because high dielectric materials allow reducing antenna dimensions. Specifically, HDAs make use of dielectric components either as resonators or as dielectric loading, in order to modify the response of a conductive radiator. The class of HDAs can be subdivided into the following:

a) Dielectrically Loaded Antenna (DLA): An antenna in which a traditional, electrically conductive radiating element is encased in or located adjacent to a dielectric material (generally a solid dielectric material) that modifies the resonance characteristics of the conductive radiating element. In a DLA, there is only a trivial displacement current generated in the dielectric material, and it is the conductive element that acts as the radiator, not the dielectric material. DLAs generally have a well-defined and narrowband frequency response.

b) Dielectric Resonator Antenna (DRA): An antenna in which a dielectric material (generally a solid, but could be a liquid or in some cases a gas) is provided on top of a conductive groundplane, and to which energy is fed by way of a probe feed, an aperture feed or a direct feed (e.g. a microstrip feedline). DRAs are characterised by a deep, well-defined resonant frequency, although they tend to have broader bandwidth than DLAs. It is possible to broaden the frequency response somewhat by providing an air gap between the dielectric resonator material and the conductive groundplane. In a DRA, it is the dielectric material that acts as the primary radiator, this being due to non-trivial displacement currents generated in the dielectric by the feed.

c) Broadband Dielectric Antenna (BDA): Similar to a DRA, but with little or no conductive groundplane. BDAs have a less well-defined frequency response than DRAs, and are therefore excellent for broadband applications since they operate over a wider range of frequencies. Again, in a BDA, it is the dielectric material that acts as the primary radiator, not the feed. Generally speaking, the dielectric material in a BDA and in a DRA can take a wide range of shapes.

d) Dielectrically Excited Antenna (DEA): An antenna in which a DRA, BDA or DLA is used to excite an electrically conductive radiator. DEAs are well suited to multi-band operation, since the DRA, BDA or DLA can act as an antenna in one band and the conductive radiator can operate in a different band. DEAs are similar to DLAs in that the primary radiator is a conductive component (such as a copper dipole or patch), but unlike DLAs they have no directly connected feed mechanism. DEAs are parasitic conducting antennas that are excited by a nearby DRA, BDA or DLA having its own feed mechanism.

An integrated antenna suitable for wireless communication is also disclosed in EP1225652A1. Specifically, EP1225652A1 discloses an antenna device which comprises a dielectric chip adapted to be fitted in an aperture formed in an exterior casing of a terminal unit such as a cellular phone, the dielectric chip having an outer surface thereof cooperating with an outer surface of the exterior casing to form part of an outer surface of the terminal unit, and an antenna conductor embedded into the dielectric chip and extending along the outer surface of the dielectric chip. The dielectric chip of the antenna device is so disposed as to form part of the outer surface of a terminal unit, thereby permitting the antenna device to be accommodated inside the terminal unit without causing a degraded external appearance of the terminal unit, and the antenna conductor is embedded into the dielectric chip so as to extend along the outer surface of the dielectric chip, whereby the antenna conductor is placed sufficiently away from a grounding conductor of the terminal unit, to improve the antenna performance of the antenna device.

WO05/057722 discloses an integrated antenna for mobile telephone handsets, PDAs and the like. The antenna structure comprises a dielectric pellet and a dielectric substrate with upper and lower surfaces and at least one groundplane, wherein the dielectric pellet is elevated above the upper surface of the dielectric substrate such that the dielectric pellet does not directly contact the dielectric substrate or the groundplane, and wherein the dielectric pellet is provided with a conductive direct feed structure. A radiating antenna component is additionally provided and arranged so as to be excited by the dielectric pellet. Elevating the dielectric antenna component so that it does not directly contact the groundplane or the dielectric substrate significantly improves bandwidth of the antenna as a whole.

In H. An, T. Wang. R. G. Bosisio and K. Wu "A NOVEL MICROWAVE OMNIDIRECTIONAL ANTENNA FOR WIRELESS COMMUNICATIONS", IEEE NTC '95 The Microwave Systems Conference. Conference Proceedings p. 221-4, a microwave omnidirectional antenna for wireless communications is also proposed. This antenna is constructed with cavity-restrained multi-stacked dielectric disks. Vertical polarized omnidirectional radiation patterns are obtained from radiative ring slots in the side wall of dielectric-metal cavities operating on $TM_{01\delta}$ mode. High omnidirectional gain is realized with stacked cavities with multi-radiative slots. Ring slots between the adjacent cavities are used to enhance the excitation of the desired radiating mode in phase, which actually eliminates the feed network. A special technique is adopted for excitation of the antenna from coaxial line, with which very good matching is achieved. This type of antennas could be ideal for the base or center stations for wireless and indoor communications.

Another example of antenna device suitable for mobile communications is described in Debatosh Guha, Yahia M. M. Antar: "FOUR-ELEMENT CYLINDRICAL DIELECTRIC RESONATOR ARRAY: BROADBAND LOW PROFILE ANTENNA FOR MOBILE COMMUNICATIONS", Proceedings URSI 2005 GA. Specifically, a new design of a dielectric resonator array is presented as a wideband radiator having uniform monopole-like radiation patterns. Four cylindrical DRAs are symmetrically packed together around a coaxial probe which itself is surrounded by another small dielectric cylinder, the fundamental $HE_{11\delta}$ mode in each element is employed to generate the desired radiation patterns.

OBJECT AND SUMMARY OF THE INVENTION

The Applicant has observed that usually external antennas have good performance in term of radiation efficiency, matching, bandwidth and gain. Further, RF circuits of the electronic equipment and the electronic equipment casing on which the antennas are mounted do not significantly affect antenna performance. Nevertheless, external antennas are bulky and often do not harmonize with the electronic equipment casing leading to a detrimental impact on the customer perception.

On the other hand, integrated antennas even if they improve the packaging style of the electronic equipment casing, have worse performance, in term of radiation diagram, gain, and radiation efficiency, with respect to external antennas, since they are affected by the presence of other electronic components. Moreover integrated antenna design should satisfy strict requirements due to EMC (electromagnetic compatibility) and space problem. Usually room and packaging limitation affect component performance.

The Applicant has observed that a need can exist for a class of antenna devices having performance comparable to those of the external antennas so as to be used in electronic equipments such as transceiver stations for local area radio coverage and a shape adapted to improve the packaging style of the electronic equipment casing.

The Applicant has found that this need can be met by an antenna device having a shape conformal with the electronic equipment casing and being configured so as to provide a substantially omnidirectional radiation pattern.

For the purpose of the present invention with the term "substantially omnidirectional" we intend a radiation pattern whose peak to peak ripple is limited to few dB (typically 4 or 5 dB) in a plane parallel to a main plane of the antenna device cooperating with the electronic equipment casing, and having a null of the radiated field along a direction orthogonal to said outer surface (main plane).

For the purpose of the present invention with the term "null of the radiated field" we intend a minimum value of the radiated field much lower than peak and average values of such radiated field, preferably lower by more than 10 dB than a maximum value of the radiated field and more preferably lower by more than 15 dB with respect to said maximum value.

For the purpose of the present invention with the term "conformal" we intend that the antenna device has an outer surface which cooperates with the body of the electronic equipment casing in such a way to form a portion of said casing.

The Applicant has found that a conformal shape can be obtained by making the antenna device with a low aspect ratio.

For the purpose of the present invention with the term "low aspect ratio" we intend that a ratio between a vertical dimension and a maximum horizontal dimension of the antenna device should be less than 0.5, and preferably less than 0.25.

Having an aspect ratio within the values indicated above implies that the height or vertical dimension of current external antennas (dipoles or monopoles) has to be decreased.

The Applicant has observed that a decrease of the height of common monopole or dipole antennas implies an increase of their resonant frequency.

Further, the Applicant has noted that a low aspect ratio within the values indicated above can cause an increase of the resonant frequency of monopole or dipole antennas so as to make them unusable for wireless application.

A possible solution is to load common monopole or dipole antennas with a dielectric material having a high dielectric constant.

Nevertheless, this solution presents some problems:

1) an increase of the dielectric constant involves a reduction of the antennas bandwidth. This can make the antennas unusable for wireless application;

2) an increase of the dielectric constant can make the material weaker.

The Applicant has found that a solution to these problems is to provide a method for controlling the transmission and/or reception of a radio signal from/to a wireless transceiver station provided with a casing, comprising the following steps: providing said wireless transceiver station with at least one antenna device comprising at least one resonator element cooperating with said casing and including a composite material, said resonator element being shaped so as to have a low aspect ratio and to be conformal with said casing; coupling said radio signal with said resonator element so as to resonate in it a $TM_{0,n,\delta}$ class of resonant modes.

In a second aspect, the present invention refers to a wireless transceiver station comprising at least one antenna device and a casing, said antenna device comprising at least one resonator element cooperating with the casing of said wireless transceiver station and having a shape with a low aspect ratio so as to be conformal to said casing, said at least one resonator element comprising a composite material and being adapted to be excited by a feed system which is positioned inside said resonator element so as to allow said antenna device to irradiate with a substantially omnidirectional radiation pattern.

Preferably, said feed system produces in said at least one resonator element a resonant mode of the $TM_{0,n,\delta}$ class of resonant modes.

Specifically, the electromagnetic field associated to a $TM_{0,n}$ resonant mode excited in the at least one resonator element having an axis z, has a distribution in which the z component of the magnetic field is zero or substantially lower than the transversal components (preferably lower by more than 10 dB). The first index of the term $TM_{0,n}$ is null because the electromagnetic field presents an axial symmetry around the z axis while the second index can assume integer value representing the number of nulls of the electrical field along a radial direction.

In particular, the subclass of $TM_{0,n,\delta}$ resonant modes provide an omnidirectional radiation pattern of the antenna device with a null of the radiated field in the z axis direction.

The index δ is not an integer and represents the fact that the antenna device height is smaller than λ/2 where λ is the wavelength corresponding to the frequency of the $TM_{0,n,\delta}$ resonant mode within the at least one resonator element.

Preferably the at least one resonator element has a substantially axial symmetry around the z axis.

For the purpose of the present invention with the term "substantially axial symmetry" we intend the following: for all the planar vertical sections S of the resonator element containing the z axis ("axis of symmetry of the at least one resonator element), we can define a horizontal direction u orthogonal to the z axis and we can consider the following integral:

$$\int_S \varepsilon_r'(u,z)\cdot m_s(u,z)\,du\,dz$$

where $\varepsilon_r'$ is the real part of dielectric constant of the material comprised in the at least one resonator element and $m_s$ is the mass distribution per unit area of a considered section S. In the most general case both $\varepsilon_r'$ and $m_s$ can depend on the local coordinates (u, z). In the simplest case of homogeneous system both $\varepsilon_r'$ and $m_s$ do not depend on the position and the integral reduces to the area of the cut section of the resonator element.

Calculating the integral over all the possible sections S allows obtaining a distribution of values. We consider the resonator element substantially symmetric when said distribution of values varies in the range (−25%, +25%) around the average value for all possible angular directions.

Preferably, the composite material is a dielectric material having a dielectric constant chosen in the range 5-100, preferably in the range 8-40, more preferably in the range 10-20.

Preferably, the composite material can include at least one polymeric material and at least one dielectric ceramic powder allowing the control of the dielectric constant at radiofrequency. The polymeric material may be selected for example from: a thermoplastic resin for example polypropylene or ABS (Acrylonitrile/butadiene/styrene) or mixture thereof showing relative dielectric constant $\varepsilon_r$ close to 2 and 3, respectively, and the dielectric ceramic powder may be selected for example from titanium dioxide ($TiO_2$), calcium titanate ($CaTiO_3$), or strontium titanate ($SrTiO_3$) or mixture thereof with $\varepsilon_r$ close to 100, 160 and 270, respectively.

Preferably the feed system can be positioned along the z axis or at a distance from it which is lower than λ/8 where λ is the wavelength corresponding to the frequency of the resonant mode within the resonator element.

BRIEF DESCRIPTION OF THE DRAWINGS

For a better understanding of the present invention, preferred embodiments, which are intended purely by way of example and are not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the generic principles herein may be applied to other embodiments and applications without departing from the scope of the present invention. Thus, the present invention is not intended to be limited to the embodiments shown, but is to be accorded the widest scope consistent with the principles and features disclosed herein and defined in the attached description and claims.

Reference will be made in the following to a telecommunication network such as for example a WLAN.

Generally, WLANs can be distinguished into two different classes:

- ad hoc WLANs which are networks dedicated to satisfy particular local area communication requirements;
- infrastructure WLANs which are local area network connected to other more extended communication networks.

Both these kinds of networks can include a plurality of electronic equipments corresponding to transceiver stations STAs.

In an ad hoc WLAN all STAs work peer to peer and usually they share the same communication protocols and roles.

In the second type of WLAN at least one STA implements additional functions such as bridging, routing and accessing to other networks and it is called Portal or Access Gateway. STAs and Access Gateway should satisfy the same physical layer requirements, regarding radio interface.

In this example we refer preferably to the second type of WLAN.

Figure 1:
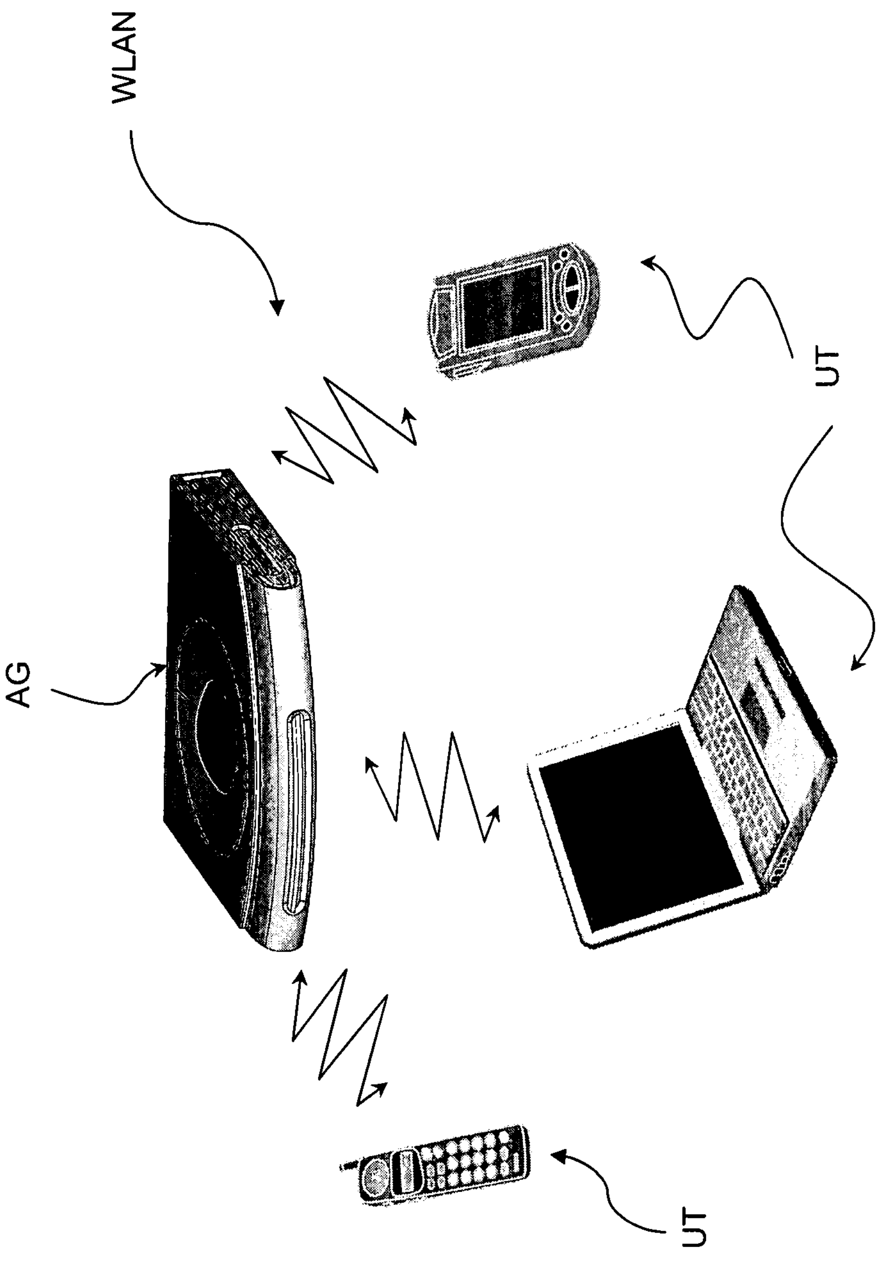
FIG. 1 shows a scheme of a generic Wireless Local Area Network WLAN.

Specifically, FIG. 1 schematically shows a WLAN wherein user terminals UTs (such as for example PCs, PDAs, Wi-Fi phones, smart-phones, etc.) are wireless connected to at least one access gateway AG which provides connectivity among the UTs and towards external communication networks.

In particular, access gateway AG is a network element that may act as an entrance point to another network, for example the Internet or a mobile communication network.

In a simplest WLAN configuration for small service areas and limited radio coverage, for example home multimedia application, the access gateway itself can provide the radio interface.

Figure 2:
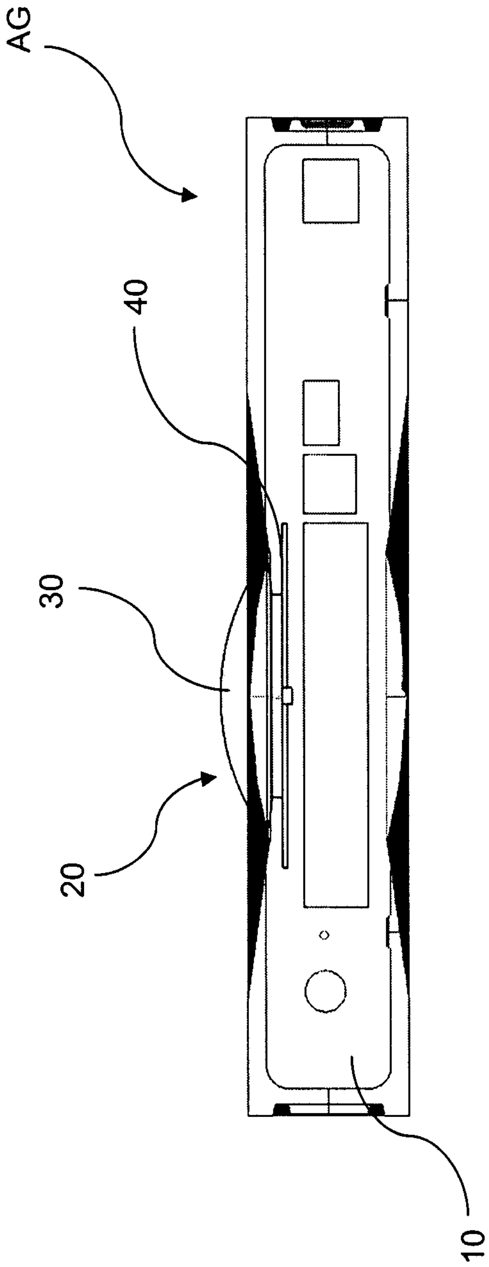
FIG. 2 shows an housing/casing of an electronic equipment operating as a WLAN access gateway which includes a first embodiment of the antenna device of the present invention.

FIG. 2 shows a side section of a casing 10 for the access gateway AG of FIG. 1. The casing 10 cooperates with at least one antenna device 20 made according to the present invention.

In an aspect of the present invention, the antenna device 20 can cooperate with the casing of one or more PCs or other electronic equipments like PDAs, wireless SetTopBoxes etc. representing user terminals UTs of the WLAN of FIG. 1.

The antenna device 20 has a shape with a low aspect ratio so as to be conformal to the casing 10 of the access gateway AG.

In particular, the antenna device 20 has an outer surface 20*a* which cooperates with the body of the casing 10 of the access gateway AG in such a way to form a portion of said casing.

For the purpose of the present invention with the term "low aspect ratio" we intend that a ratio between a vertical and a maximum horizontal dimension of the antenna device should be less than 0.5, and preferably less than 0.25.

Further, the antenna device is configured so as to provide a substantially omnidirectional radiation pattern.

For the purpose of the present invention with the term "substantially omnidirectional" we intend a radiation pattern whose peak to peak ripple is limited to few dB (typically 4 or 5 dB) in a main plane and having a null of the radiated field along a direction orthogonal to said main plane.

For the purpose of the present invention with the term "null of the radiated field" we intend a minimum value of the radiated field much lower than peak and average values of such radiated field, preferably lower by more than 10 dB than a maximum value of the radiated field and more preferably lower by more than 15 dB with respect to said maximum value.

Specifically the antenna device 20 comprises at least one resonator element 30 and a groundplane 40 supporting the resonator element 30.

The resonator element 30 has a substantially axial symmetry as defined above around an axis z which extends along the direction of the null of the radiated field.

The resonator element 30 is made by a composite material having a dielectric constant chosen in the range 5-100, preferably in the range 8-40, more preferably in the range 10-20.

In particular, the composite material can include at least one polymeric material and at least one dielectric ceramic powder. For example, the polymeric material is a thermoplastic resin that may be selected for example from polypropylene or ABS (Acrylonitrile/butadiene/styrene) or a mixture thereof showing relative dielectric constant $\varepsilon_r$ close to 2 and 3, respectively, and the dielectric ceramic powder may be selected for example from titanium dioxide ($TiO_2$), calcium titanate ($CaTiO_3$), or strontium titanate ($SrTiO_3$) or a mixture thereof with $\varepsilon_r$ close to 100, 160 and 270, respectively.

It is remarked that the dielectric constant at radiofrequency of the resonator element can be controlled by selecting the relative amount of the polymeric material and the ceramic powders within the composite material.

A composite material suitable for making the resonator element 30 is for example described in "POLYMERIC COMPOSITES FOR USE IN ELECTRONIC AND MICROWAVE DEVICES" A. Moulart, C. Marrett and J. Colton Polymer Engineering and Science, March 2004, No. 3, or disclosed in U.S. Pat. No. 5,154,973 (Imagawa et al. Oct. 13, 1992).

Preferably the groundplane 40 is a metal groundplane having a circular shape but other shapes such as rectangular or square shapes can also be used.

Figure 3:
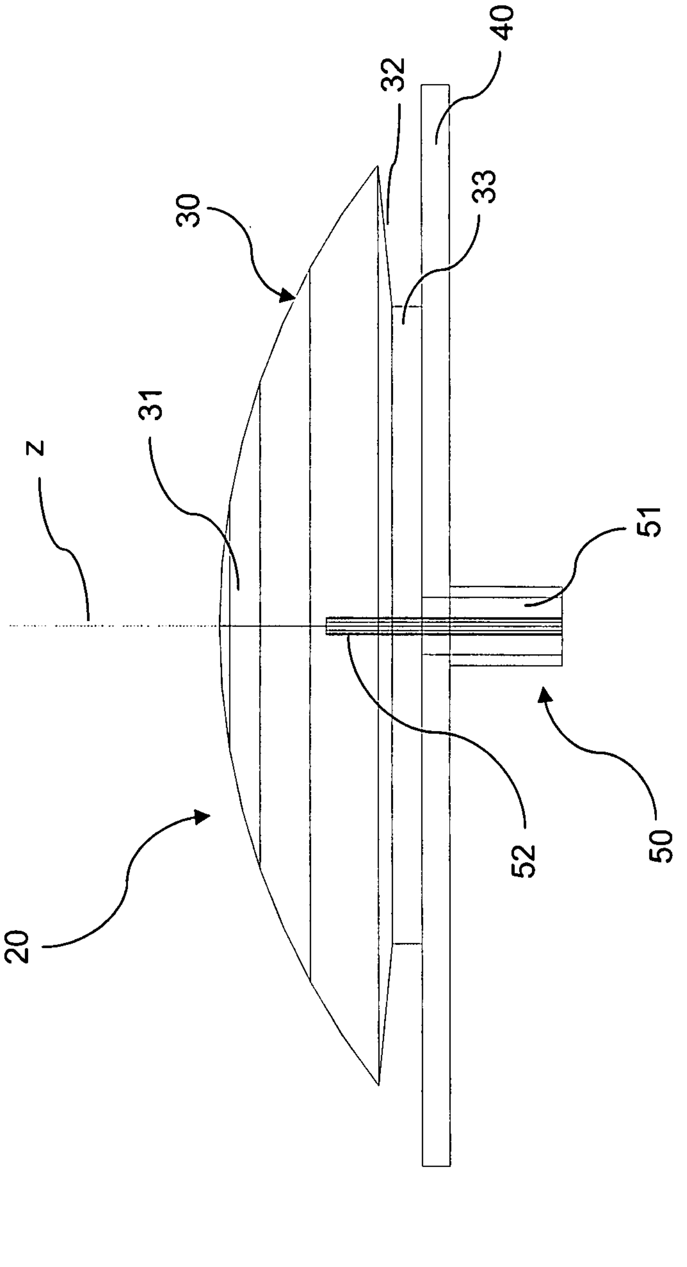
FIG. 3 shows a side view of the antenna device of FIG. 2.

According to a first embodiment of the present invention shown in FIG. 3, the conformal shape of the antenna device 20 and in particular of the resonator element 30 is provided by the composition of three dielectric portions, each having a respective geometrical shape: a sphere cap 31, supported by a reversed cut cone 32 supported by a cylinder 33. The bottom of the cylinder 33 is placed in such a way to contact the metal groundplane 40.

In this embodiment the diameter and the height of the resonator element 30 are 64.73 mm and 14.4 mm respectively, the diameter of the cylinder 33 is 44.8 mm and the dielectric constant of the composite material is 14.3. The composite material has a dielectric constant value that can be obtained with a composite having the formulation: 84% wt $TiO_2$ and 16% wt polypropylene.

Figure 4:
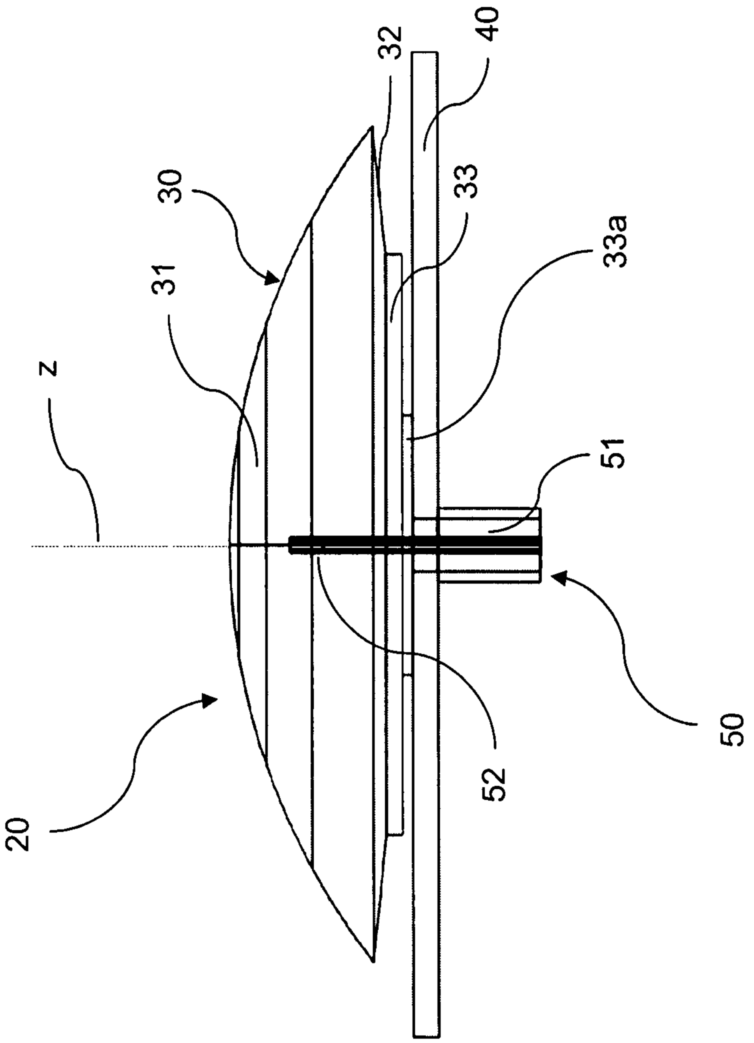
FIG. 4 shows a side view of the antenna device of FIG. 2 with a possible stepped profile on the bottom.

In an aspect of the present invention shown in FIG. 4, the bottom of the cylinder 33 can be partially cut off, in order to obtain a stepped profile of the cylinder 33 (portion 33*a*), thus reducing the dielectric portion of the cylinder 33 connected to the metal groundplane 40. Other parts of the antenna device 20 are the same as those shown in FIG. 3; they are therefore provided with the same reference numbers as those previously used, and will not be described again.

The portion of the cylinder 33 removed can be more than 50% in diameter. This strategy can be adopted when a wider bandwidth is required. In fact, it allows reducing the value of the effective relative dielectric constant at the bottom of the antenna device 20.

Figure 5:
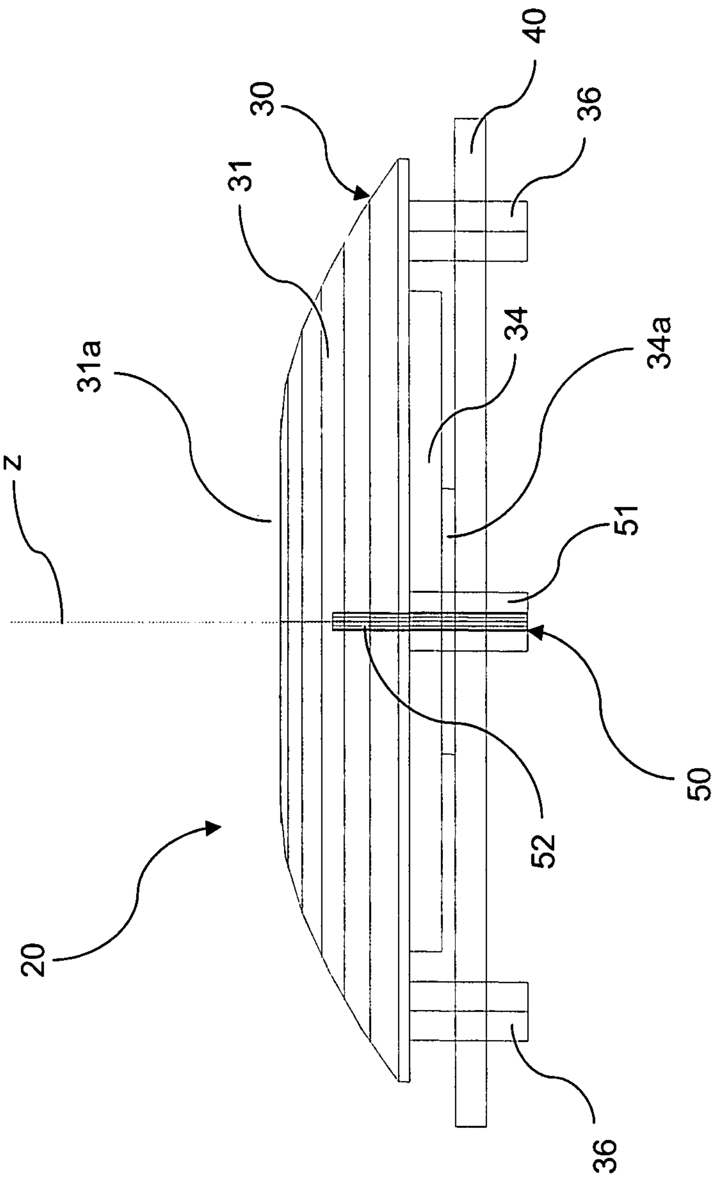
FIG. 5 shows a side view of the antenna device of FIG. 2 with a possible stepped profile on the bottom and a flat cut on the top.

In a further aspect of the present invention shown in FIG. 5, the top of the sphere cap 31 can be partially cut off (portion 31*a*) and the reversed cut cone 32 replaced by a cylinder 34, in order to obtain a reduced profile of the resonator element 30, thus reducing dielectric volume and allowing a better integration of the antenna device 20 inside the casing 10. The height of the portion removed from the top of the sphere cap 31 can be about 10-20% of the total height of the resonator element 30. Also in this case the bottom of the cylinder 34 can be partially cut off. A number of supporting elements 36, preferably four elements of cylindrical shape, are provided between the lower part of the sphere cap 31 and the casing 10, to support the resonator element 30 with respect to said casing.

Other parts of the antenna device 20 are the same as those shown in FIG. 3; they are therefore provided with the same reference numbers as those previously used, and will not be described again.

Again with reference to FIG. 3, a feed system 50 of the antenna device 20 can comprise a coaxial connector 51 and a metal pin 52 extending along the z axis from the coaxial connector 51 inside the resonator element 30. The metal pin 52, which can be derived by the central pin of the coaxial connector 51, can be positioned along the z axis or at a distance from it lower than $\lambda/8$ where $\lambda$ is the wavelength of the electric field within the resonator element 30.

In this way the resonator element 30 is excited so as to produce in it a resonant mode of the $TM_{0,n,\delta}$ class of resonant modes as defined above. This resonant mode allows said antenna device to irradiate with a substantially omnidirectional radiation pattern with a null along the z axis.

Figure 6:
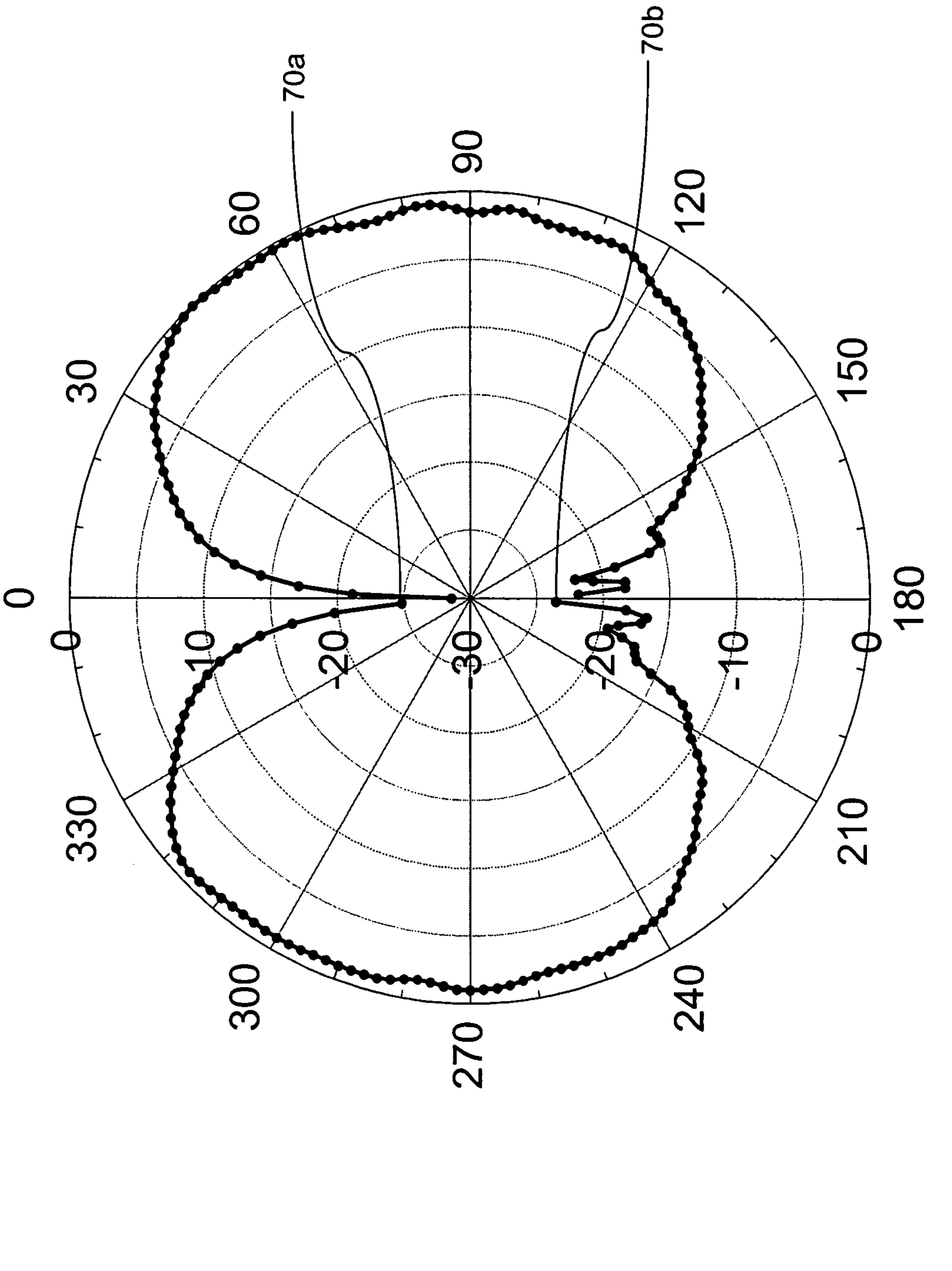
FIG. 6 shows a typical vertical measured cut of the radiation pattern of the antenna device of FIGS. 3, 4 and 5.

FIG. 6 shows a radiation pattern of the first embodiment of the antenna device 20 measured in a plane extending along the z axis perpendicular to the main plane of the antenna device 20 at a frequency of 2.45 GHz (the central frequency of the Wi-Fi band). Normalized radiation intensity in dB is shown as a function of the angular direction. It can be seen that the radiation pattern has two nulls or near-nulls 70*a*, 70*b* of the radiated field in the direction of the z axis.

Ripples in the radiation pattern are supposed to be due to the influence of the finite metal groundplane 40 and to measurement set up supporting the antenna device 20 in anechoic chamber.

Figure 7:
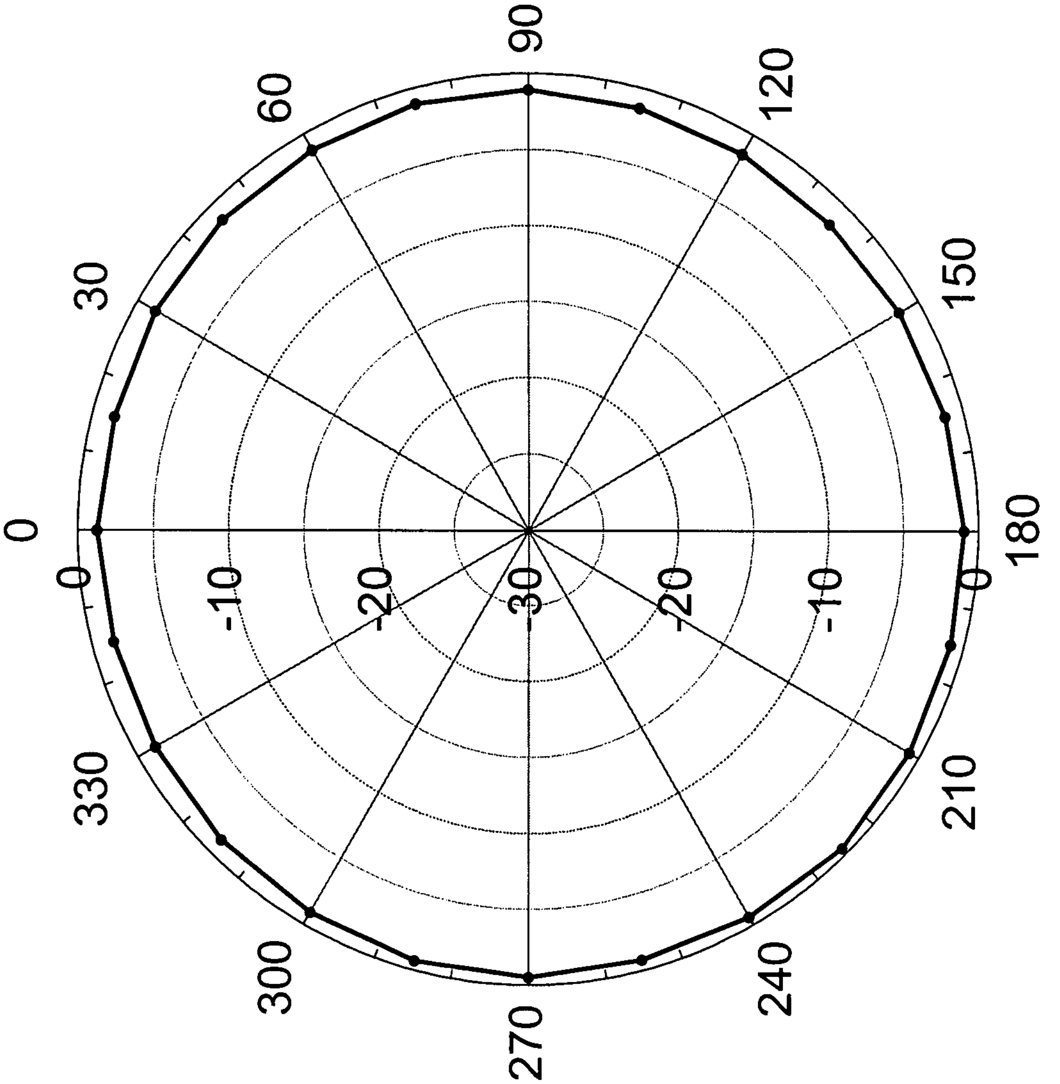
FIG. 7 shows a typical horizontal measured cut of the radiation pattern of the antenna device of FIGS. 3, 4 and 5.

On the main plane the radiation pattern is substantially omnidirectional as shown in FIG. 7, wherein the normalized radiation intensity in dB is given as a function of the angular direction. A ripple of less than about 2 dB is shown.

Figure 8:
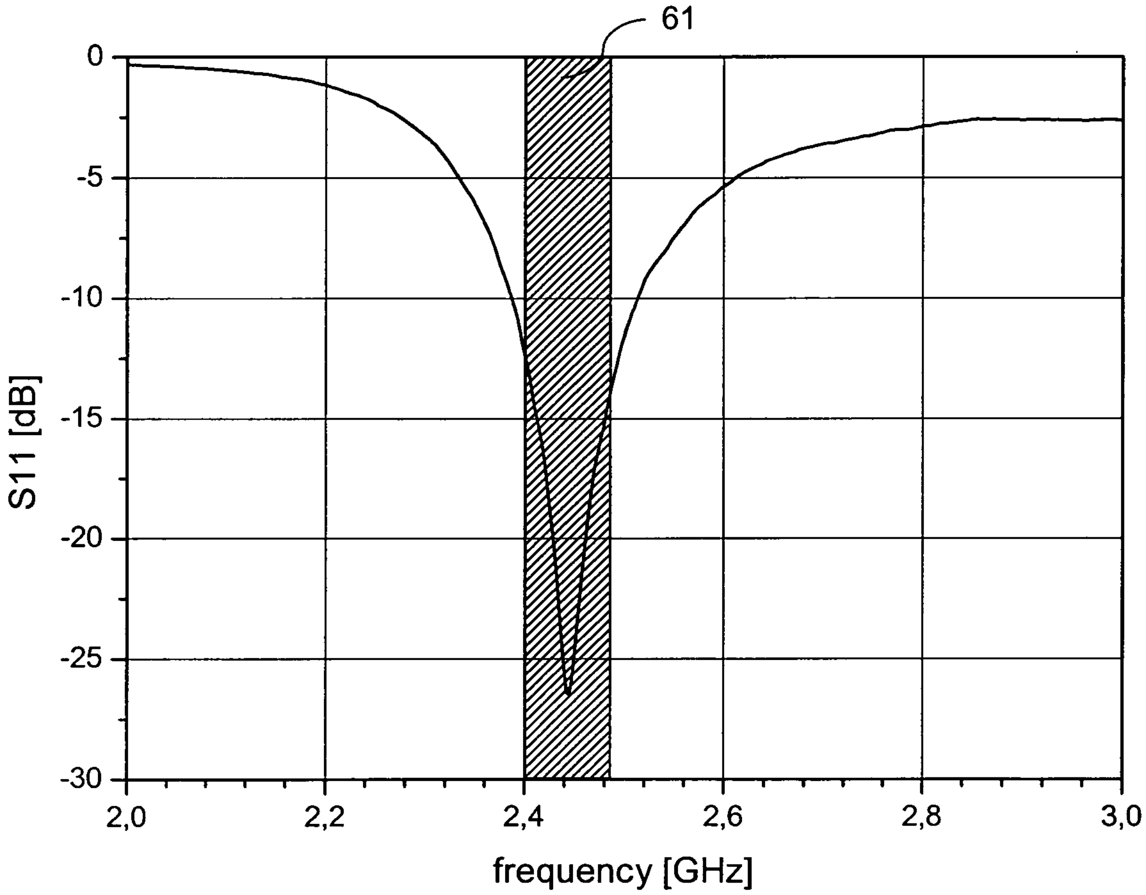
FIG. 8 shows a typical return loss diagram of the antenna device of FIGS. 3, 4 and 5.

FIG. 8 shows the measured return loss of the first embodiment of the antenna device 20. The antenna device 20 has a good match in the band 2400 MHz-2500 MHz. This makes the antenna device 20 adapted to be used with different WLAN protocols such as Wi-Fi (the antenna achieves return loss <−13.5 dB in Wi-Fi band 61) Bluetooth and other protocols involving similar physical requirements.

Figure 9:
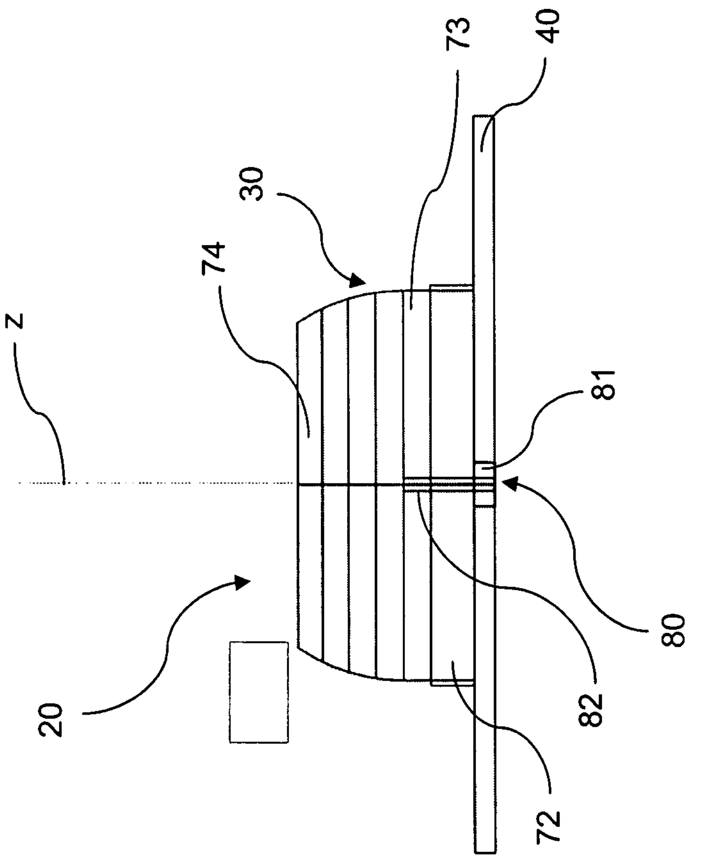
FIG. 9 shows a side view of a second embodiment of the antenna device of the present invention.

According to a second embodiment of the present invention shown in FIG. 9, the at least one resonator element 30 is partly enclosed in a conductive wall 72 connected to the metal groundplane 40.

Preferably, the conductive wall 72, which allows controlling frequency, bandwidth and matching of the antenna device 20 has a cylindrical shape.

The conformal shape of the resonator element 30 is provided by the composition of two dielectric portions, each having a respective geometrical shape: a cylinder 73 overlapped by a cut sphere 74. The conductive wall 72 encloses the bottom portion of cylinder 73.

In this embodiment, the diameter and the height of the resonator element 30 are 19 mm and 17 mm respectively. The composite material has a dielectric constant of 13.9 which can be obtained with a composite having the formulation: 83% wt $TiO_2$ and 17% wt polypropylene.

Also in this embodiment, the feed system 80 of the antenna device 20 comprises a coaxial connector 81 and a metal pin 82 extending along the z axis from the coaxial connector 81 until the cylinder 73. Preferably, the metal pin 82, which is derived by the central pin of the coaxial connector 81, can be positioned along the z axis or at a distance from it lower than $\lambda/8$ where $\lambda$ is the wavelength of the electric field within the resonator element.

Figure 10:
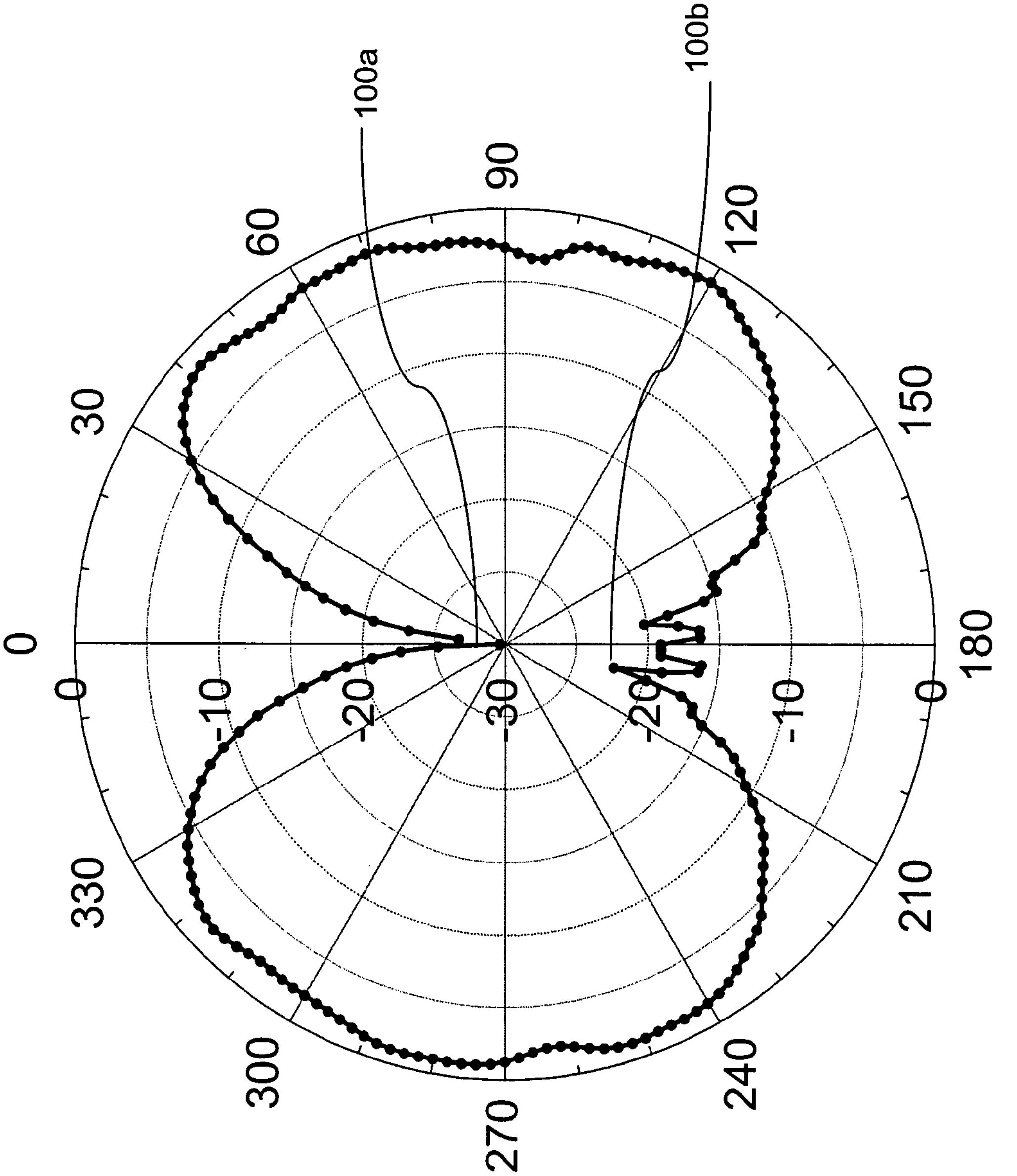
FIG. 10 shows a vertical measured cut of the radiation pattern of the antenna device of FIG. 9.

FIG. 10 shows a radiation pattern of the second embodiment of the antenna device 20 measured in a plane extending along the z axis and perpendicular to the main plane of the antenna device 20 at a frequency of 2.45 GHz (the central frequency of the Wi-Fi band). It can be seen that the radiation pattern has two nulls or near-nulls 100*a*, 100*b* of the radiated field in the direction of the z axis. Also in this case, ripples in the radiation pattern are supposed to be due to the influence of the finite metal groundplane 40 and to measurement set up supporting the antenna device 20 in anechoic chamber.

Figure 11:
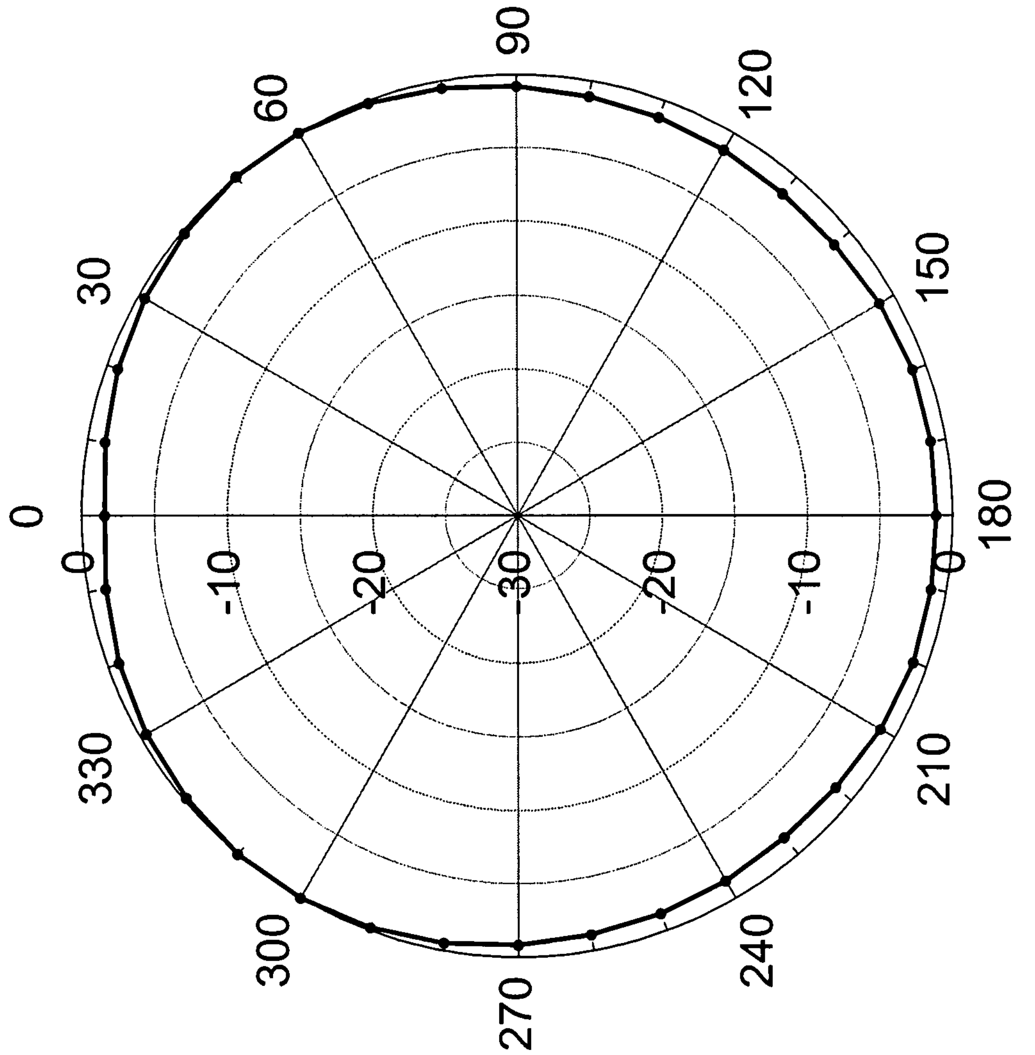
FIG. 11 shows a horizontal measured cut of the radiation pattern of the antenna device of FIG. 9.

On the main plane the radiation pattern is substantially omnidirectional as shown in FIG. 11. A ripple of less than about 2 dB is found.

The advantages of the present invention are evident from the foregoing description.

In particular, the class of antenna device of the present invention has performance comparable to those of the dipoles or monopoles antennas and a shape with low aspect ratio adapted to be conformal with an electronic equipment casing (for example the casing of a transceiver station of a wireless communication network).

Further, the technology of composite constant plastic material allows a better packaging of the antenna device in the electronic equipment casing in such a way that it can become part of the casing itself.

The invention claimed is:

1. A method for controlling the transmission and/or reception of a radio signal, comprising:
- (a) providing a wireless transceiver station with a casing and with at least one antenna device including:
  - (i) a groundplane; and
  - (ii) at least one resonator element, said at least one resonator element:
    - (A) cooperating with said casing,
    - (B) including composite material,
    - (C) being shaped so as to have a low aspect ratio with respect to said casing, and
    - (D) being shaped so as to be conformal with said casing, wherein conformal includes an outer surface of said at least one resonator device forming a portion of said casing;
    - (E) supported by said groundplane; and
- (b) coupling the radio signal so as to resonate therein a resonant mode of a TM0,n,δ class of resonant modes.

2. An apparatus comprising:
- (a) a wireless transceiver station including at least one antenna device and
- (b) a casing, said antenna device including:
- (i) a groundplane; and
- (ii) at least one resonator element, said at least one resonator element:
  - (A) cooperating with said casing of the wireless transceiver station;
  - (B) including composite material;
  - (C) being shaped so as to have a low aspect ratio with respect to said casing;
  - (D) being shaped so as to be conformal with said casing, wherein conformal includes an outer surface of said at least one resonator device forming a portion of said casing;
  - (E) supported by said groundplane; and
  - (F) capable of being adapted to be excited by a feed system which is positioned inside said resonator element so as to allow said antenna device to irradiate with a substantially omnidirectional radiation pattern wherein said feed system produces in said at least one resonator element a resonant mode of a TM0,n,δ class of resonant modes.

3. The wireless transceiver station of claim 2, wherein said substantially omnidirectional radiation pattern has a peak to peak ripple limited to less than 5 dB along a main plane of said antenna device and a minimum of a radiated field along a direction perpendicular to said main plane.

4. The wireless transceiver station of claim 3, wherein said peak to peak ripple is 4 dB.

5. The wireless transceiver station according to claim 3, wherein said minimum value is lower by more than 10 dB than a maximum value of the radiated field.

6. The wireless transceiver station according to claim 5, wherein said minimum value is lower by more than 15 dB than a maximum value of the radiated field.

7. The wireless transceiver station according to claim 3, wherein said at least one resonator element has a substantially axial symmetry around an axis which extends along a direction of the minimum of the radiated field.

8. The wireless transceiver station according to claim 1, wherein said composite material has a dielectric constant of 5-100.

9. The wireless transceiver station according to claim 8, wherein said dielectric constant is 8-40.

10. The wireless transceiver station according to claim 9, wherein said dielectric constant has a value of 10-20.

11. The wireless transceiver station according to claim 8, wherein said composite material includes at least one polymeric material and at least one dielectric ceramic powder.

12. The wireless transceiver station according to claim 11, wherein said polymeric material is a thermoplastic resin.

13. The wireless transceiver station according to claim 12, wherein said polymeric material is selected from polypropylene and acrylonitrile/butadiene/styrene or a mixture thereof.

14. The wireless transceiver station according to claim 12, wherein said dielectric ceramic powder is selected from titanium dioxide, calcium titanate, and strontium titanate, or a mixture thereof.

15. The wireless transceiver station according to claim 7, wherein said feed system is positioned at a distance from said axis of symmetry of said at least one resonator element which is lower than $\lambda/8$ where $\lambda$ is a wavelength corresponding to a resonant within the resonator element.

16. The wireless transceiver station according to 15, wherein said feed system includes a coaxial connector and a metal pin.

17. The wireless transceiver station according to claim 16, wherein said metal pin is derived from a central pin of said coaxial connector.

18. The wireless transceiver station according to claim 1, wherein said resonator element has an aspect ratio lower than 0.5.

19. The wireless transceiver station according to claim 18, wherein said low aspect ratio is less than 0.25.

20. The wireless transceiver station according to claim 1, wherein said at least one resonator element is in a configuration selected from the group consisting of:

(a) a sphere cap, supported by a reversed cut cone, supported by a cylinder and a bottom of said cylinder, (b) a sphere cap, supported by a reversed cut cone, supported by a cylinder and a bottom of said cylinder, wherein said bottom of said cylinder is partially cut off, (c) a sphere cap and a cylinder supported by said sphere cap, said sphere cap having a top partially cut off, (d) partly enclosed in a conductive wall connected to said groundplane, (e) partly enclosed in a conductive wall connected to said groundplane, wherein said conductive wall has a cylindrical shape, and (f) partly enclosed in a conductive wall connected to said groundplane, wherein said at least one resonator element includes a cylinder overlapped by a cut sphere.

21. An apparatus comprising:

(a) a wireless transceiver station including at least one antenna device and (b) a casing, said antenna device including:

(i) a groundplane; and (ii) at least one resonator element, said at least one resonator element:

(A) cooperating with said casing of the wireless transceiver station;

(B) including composite dielectric material comprising at least one polymeric material and at least one dielectric ceramic powder;

(C) being shaped so as to have a low aspect ratio with respect to said casing so as to be mounted in an opening in said casing and to extend via said opening;

(D) being shaped so as to be conformal with said casing, wherein conformal includes an outer surface of said at least one resonator device forming a portion of said casing;

(E) supported by said groundplane;

(F) capable of being adapted to be excited by a feed system which is positioned inside said resonator element so as to allow said antenna device to irradiate with a substantially omnidirectional radiation pattern wherein said feed system produces in said at least one resonator element a resonant mode of a TM0,n,δ class of resonant modes, and (G) includes a sphere cap, supported by a reversed cut cone, supported by a cylinder.

22. The method of claim 1 wherein said groundplane is internal to said casing.

23. The wireless transceiver station of claim 2 wherein said groundplane is internal to said casing.

* * * * *